(12) United States Patent
Steele

(10) Patent No.: US 8,414,681 B2
(45) Date of Patent: Apr. 9, 2013

(54) SYSTEM AND METHOD FOR CONTROLLING AN AIR SEPARATION UNIT

(75) Inventor: Raymond Douglas Steele, Cypress, TX (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 12/875,053

(22) Filed: Sep. 2, 2010

(65) Prior Publication Data

US 2012/0055331 A1     Mar. 8, 2012

(51) Int. Cl.
*B01D 46/00* (2006.01)
(52) U.S. Cl. .................. 95/8; 62/643; 62/656; 60/39.12
(58) Field of Classification Search .................. 95/1, 8, 95/54, 130; 96/4, 109, 111, 121; 62/640, 62/643, 656; 60/39.12
See application file for complete search history.

(56) References Cited

U.S. PATENT DOCUMENTS

| | | | | |
|---|---|---|---|---|
| 5,746,806 A * | 5/1998 | Aylsworth et al. | ................... | 95/8 |
| 5,840,098 A * | 11/1998 | Barbe et al. | ....................... | 95/18 |
| 6,006,546 A * | 12/1999 | Espie | .............................. | 62/656 |
| 6,134,916 A * | 10/2000 | Jahnke | ............................ | 62/648 |
| 6,345,517 B1 * | 2/2002 | Jahnke | ............................ | 62/643 |
| 6,588,212 B1 * | 7/2003 | Wallace et al. | .................. | 60/772 |
| 6,866,701 B2 * | 3/2005 | Meirav | ................................ | 96/4 |
| 7,303,606 B2 * | 12/2007 | Zeng et al. | ....................... | 95/114 |
| 7,655,213 B2 | 2/2010 | Winter et al. | | |
| 2005/0160909 A1 * | 7/2005 | Meirav | ............................. | 96/108 |
| 2008/0115483 A1 * | 5/2008 | Moore et al. | ................ | 60/39.461 |
| 2008/0134886 A1 * | 6/2008 | Jensvold | ............................ | 95/54 |
| 2009/0293723 A1 | 12/2009 | Steele | | |
| 2010/0199558 A1 | 8/2010 | Steele | | |

* cited by examiner

*Primary Examiner* — Frank Lawrence, Jr.
(74) *Attorney, Agent, or Firm* — Fletcher Yoder P.C.

(57) ABSTRACT

A system includes an air separation unit configured to separate air into an oxygen rich stream and a nitrogen rich stream and a purity control system configured to receive input indicative of a target diluent level. The purity control system is configured to control the air separation unit to adjust an oxygen percentage and a nitrogen percentage of the oxygen rich stream based on the target diluent level.

20 Claims, 3 Drawing Sheets

SYSTEM AND METHOD FOR CONTROLLING AN AIR SEPARATION UNIT

BACKGROUND OF THE INVENTION

The subject matter disclosed herein relates to air systems, more particularly, to systems and methods for controlling air separation units (ASUs), and more specifically, to ASUs found in gasification plants and facilities.

ASUs may be used in facilities, such as refineries, petrochemical plants, or power stations, to separate atmospheric air into its primary components, such as oxygen and nitrogen. Some of these facilities may include partial oxidation systems that partially oxidize a fuel with the oxygen provided by the ASUs to create heat and/or energy. For example, an integrated gasification combined cycle (IGCC) power plant includes one or more gasifiers that react a feedstock at a high temperature with the oxygen from one or more ASUs to produce a syngas, which may in turn be used as a fuel in a gas turbine to create energy that generates power. ASUs are typically expensive and contribute to a significant portion of the total cost of the IGCC. In addition, the air separation process performed by the ASUs consumes large quantities of energy, thereby decreasing the efficiency of the gasification process.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an air separation unit configured to separate air into an oxygen rich stream and a nitrogen rich stream and a purity control system configured to receive input indicative of a target diluent level for a partial oxidation system. The purity control system is configured to control the air separation unit to adjust an oxygen percentage and a nitrogen percentage of the oxygen rich stream based on the target diluent level.

In a second embodiment, a system includes an air separation control system configured to control an air separation unit to separate air into an oxygen rich stream and a nitrogen rich stream. The air separation control system is configured to receive input indicative of a target diluent level of nitrogen for an oxygen dependent system. The air separation control system is configured to adjust an oxygen percentage and a nitrogen percentage of the oxygen rich stream based on the target diluent level.

In a third embodiment, a method includes separating air into an oxygen rich stream and a nitrogen rich stream via an air separation unit, receiving input indicative of a target diluent level for a partial oxidation system, and controlling an oxygen percentage and a nitrogen percentage of the oxygen rich stream produced from the air separation unit based on the target diluent level.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
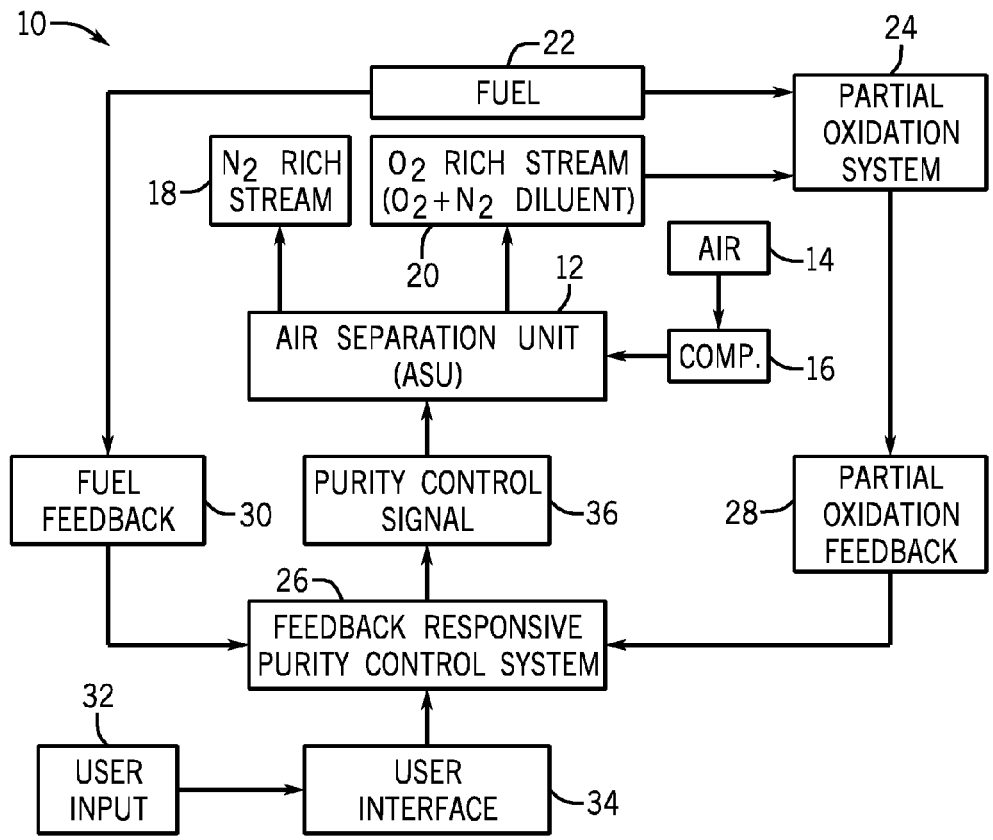
FIG. 1 is a block diagram of an ASU and a purity control system according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include systems and methods directed toward ASUs that are configured to separate air into an oxygen rich stream and a nitrogen rich stream. A "rich" stream may include in excess of approximately 50 percent of the named component. For example, the oxygen rich stream may include in excess of approximately 50 percent oxygen. The balance of the oxygen rich stream may include primarily nitrogen and argon. The ASU may also be capable of separating air into other streams, such as an argon rich stream. Although ASUs may use a variety of techniques for air separation, the various embodiments discussed in detail below may be applied regardless of what specific technique is used by the ASU.

In various embodiments, the oxygen rich stream may be used in an oxygen dependent system, such as a partial oxidation system or a gasification system. The oxygen dependent system may also be supplied a diluent, such as nitrogen, to control various parameters of the oxygen dependent system. Thus, a target diluent level may be established for the oxygen dependent system. Instead of supplying the oxygen dependent system with separate oxygen and diluent streams, as with other ASUs, in certain embodiments, the ASU may be configured to supply the oxygen rich stream with a composition such that the target diluent level may be met using the nitrogen in the oxygen rich stream. In other words, the ASU may be configured or derated to supply the oxygen rich stream with an oxygen percentage and a nitrogen percentage based on the target diluent level. Thus, embodiments of the derated ASU may be smaller, less complicated, and/or less expensive than other ASUs, because the oxygen rich stream includes more nitrogen. Alternatively, in other embodiments, a purity control system may receive input indicative of the target diluent level from various sensors throughout the oxygen dependent system. The purity control system may be configured to control the ASU to adjust the oxygen percentage and nitrogen percentage of the oxygen rich stream based on the target diluent level. In other words, the target diluent level may vary and thus, the purity control system may be able to control the ASU based on such variations in the target diluent level. In further embodiments, the derated ASU may be combined with the purity control system, such that the ASU may be controlled to respond to variations in the target diluent level. In other words, the ASU may be derated to supply the oxygen rich stream that includes sufficient nitrogen to meet a normal target diluent level, but may also have sufficient capacity to be controlled by the purity control system to supply the oxygen rich stream that meets a new or varied target diluent level.

Turning now to the drawings, FIG. 1 is a block diagram showing a system 10 that includes an embodiment of an ASU 12 with purity control to meet demands of a target application, e.g., a partial oxidation system 24. An air compressor 16 compresses atmospheric air 14 before supplying the atmospheric air 14 to the ASU 12. The air compressor 16 compresses the air 14 to an elevated pressure. The ASU 12 separates the compressed air into its components as will be described in detail below. Two of the streams that may be produced by the ASU 12 include a nitrogen rich stream 18 and an oxygen rich stream 20, both of which may be in a gaseous state. In certain embodiments, the ASU 12 may produce streams that are rich in other gases, such as argon, carbon dioxide ($CO_2$), neon, helium, methane, krypton, or combinations thereof.

In an embodiment, the purity of the nitrogen rich stream 18 may be greater than approximately 90 percent, 95 percent, 98 percent, or 99 percent nitrogen. Impurities in the nitrogen rich stream 18 may include oxygen and other gases present in air. In another embodiment, the purity of the oxygen rich stream 20 may be selectively varied or preset based on a desired purity level or diluent level for a target application. The purity of the oxygen rich stream 20 may be specifically reduced to maintain some impurities, e.g., nitrogen and argon, thereby eliminating the need for a separate diluent in the target application. Accordingly, the purity of the oxygen rich stream 20 may range between approximately 60 to 100 percent, 65 to 95 percent, 70 to 90 percent, 75 to 85 percent, or any other desired percent by volume of oxygen. For example, the purity level of the oxygen rich stream 20 may be approximately 5 percent, 15 percent, or 25 percent less than the purity level of oxygen rich streams produced by other ASUs. In other words, in certain embodiments, the ASU 12 is controlled to produce the oxygen rich stream 20 with a lower purity of oxygen than other ASUs. Because embodiments of the ASU 12 may produce lower purity oxygen, they may be smaller and/or less expensive than other ASUs. Thus, the overall efficiency of the system 10 may improve. Impurities in the oxygen rich stream 20 may include nitrogen and other gases present in air. For example, the concentration of nitrogen present in the oxygen rich stream 20 may be between approximately 10 to 40 percent, 15 to 30 percent, or 20 to 25 percent nitrogen. The nitrogen present in the oxygen rich stream 20 may be used as a diluent as described in detail below. Both the nitrogen rich stream 18 and the oxygen rich stream 20 are streams produced directly by the ASU 12 and not mixtures of other streams from the ASU 12. For example, the oxygen rich stream 20 from the ASU 12 is not a mixture of a relatively pure stream of oxygen and a relatively pure stream of nitrogen. In further embodiments, the ASU 12 may produce one or more oxygen rich streams 20, each with different compositions.

A fuel 22 and the oxygen rich stream 20 may be injected into the partial oxidation system 24, or more generally, any oxygen dependent system, to produce energy. In other words, the fuel 22 and the oxygen in the oxygen rich stream 20 react to produce heat and gases, which may include, but are not limited to, $CO_2$, water, carbon monoxide (CO), soot, and combinations thereof. The heat generated in the partial oxidation system 24 may be transferred to other process streams. The gases produced in the partial oxidation system 24 may be used to drive a load, such as a combustion turbine, or may be themselves used as fuel. The fuel 22 may be any carbonaceous material, such as biofuels and fossil fuels, that can be used to generate energy in the form of mechanical work. In addition to the partial oxidation system 24, the oxygen rich stream 20 may be supplied to other processes in the system 10 where oxygen is used.

As mentioned above, the nitrogen in the oxygen rich stream 20 is used as the diluent in the partial oxidation system 24. Therefore, certain embodiments will eliminate a separate diluent stream. Examples of other diluents that may be eliminated in various embodiments include, but are not limited to, water, $CO_2$, steam, water vapor, or combinations thereof. In other embodiments, a separate diluent stream may be used in situations in which the amount of diluent in the oxygen rich stream 20 is insufficient. By including the diluent in the oxygen rich stream 20 supplied to the partial oxidation system 24, the configuration of the system 10 may be simplified, which may also reduce the cost of the system 10. Moreover, the size and/or capacity of embodiments of the ASU 12 may be reduced, which may reduce both the capital and operating costs of the ASU 12. For example, the amount of work used by the ASU 12 for separation may increase as much as exponentially with the purity of oxygen in the oxygen rich stream 20. Thus, embodiments of the ASU 12 may use substantially less energy than other ASUs. That is, the nitrogen that other ASUs separated from air to be used as a separate diluent may instead be left with oxygen in the oxygen rich stream 20 produced by embodiments of the ASU 12. Diluents may be used to control a temperature, pressure, or rate of partial oxidation of the partial oxidation system 24. For example, because the nitrogen and argon in the oxygen rich stream 20 does not participate in the partial oxidation reaction of the partial oxidation system 24, the amount of nitrogen may be adjusted to control the rate of partial oxidation. If the rate of partial oxidation or the temperature of the partial oxidation system 24 exceeds a threshold, the amount of nitrogen in the oxygen rich stream 20 may be increased to slow the rate of partial oxidation and/or reduce the temperature of the partial oxidation system 24. Alternatively, the amount of nitrogen in the oxygen rich stream 20 may be decreased to achieve the opposite effect. The amount of nitrogen and/or oxygen in the oxygen rich stream 20 may be adjusted by varying the operation of the ASU 12 as described in detail below.

Returning to the ASU 12, an air separation control system or feedback responsive purity control system 26 may be used to control the ASU 12. The purity control system 26 may be a standalone process control system or part of a larger process control system. Examples of technologies that may be used for the purity control system 26 include, but are not limited to, open or closed loop control, linear or non-linear control, programmable logic controllers (PLCs), distributed controlled systems (DCS), model predictive control, statistical process control, or other methods of advanced process control. The purity control system 26 may receive input indicative of operational characteristics from various sources, such as sensors, users, or other process control system, and may provide output to various devices, such as control valves, motors, switches, or other process control system. More generally, the input received by embodiments of the purity control system 26 may include any oxygen driven reaction characteristic of the oxygen dependent system. For example, in certain embodiments, the purity control system 26 may receive partial oxidation feedback 28 from the partial oxidation system 24. The partial oxidation feedback 28 may include signals from a variety of sensors disposed throughout the partial oxidation system 24 indicative of characteristics of the partial oxidation system 24. Examples of parameters that may be monitored by the sensors of the partial oxidation system 24 include, but are not limited to, temperature, pressure, flow rate, oxidation dynamics, or emissions levels. In addition, the purity control system 26 may receive fuel feedback 30 relating to the fuel 22 or fuel injection system. The fuel feedback 30 may include signals from sensors monitoring parameters indicative of characteristics of the fuel 22 or fuel injection system, such as fuel properties, fuel composition, temperature, pressure, or flow rate. Examples of fuel properties include, but are not limited to, water content, ash content, and the heat of combustion or heating value. Further, the purity control system 26 may receive user input 32 through a user interface 34. The user input 32 may include set points or other instructions for the purity control system 26.

The purity control system 26 may use a control model or instructions stored in control software and/or a memory of the purity control system 26, in combination with the partial oxidation feedback 28, the fuel feedback 30, and the user input 32, to output a purity control signal 36, which may be used by the ASU 12 to generate the oxygen rich stream 20 with a desired purity. For example, the partial oxidation feedback 28 may indicate that a temperature of the partial oxidation system 24 is above a threshold value, which may be established to protect a component of the partial oxidation system 24, such as refractory materials. The purity control system 26 may output a purity control signal 36 that directs the ASU 12 to produce the oxygen rich stream 20 with a lower purity. In other words, the amount of nitrogen diluent in the oxygen rich stream 20 may be increased by reducing the oxygen purity in the oxygen rich stream 20. Thus, a flow rate of oxygen to the partial oxidation system 24 is decreased and a flow rate of nitrogen diluent is increased in response to the purity control signal 36. If the purity of the oxygen rich stream 20 is decreased, the temperature of the partial oxidation system 24 may also decrease because partial oxidation is less efficient or occurs at a slower rate. As a further example, the fuel feedback 30 may indicate that the heat of combustion property of the fuel 22 has decreased. The purity control system 26 may output a purity control signal 36 that directs the ASU 12 to produce the oxygen rich stream 20 with a higher purity. If the purity of the oxygen rich stream 20 is increased, the temperature of the partial oxidation system 24 may be maintained even using the fuel 22 with a decreased heat of combustion.

Figure 2:
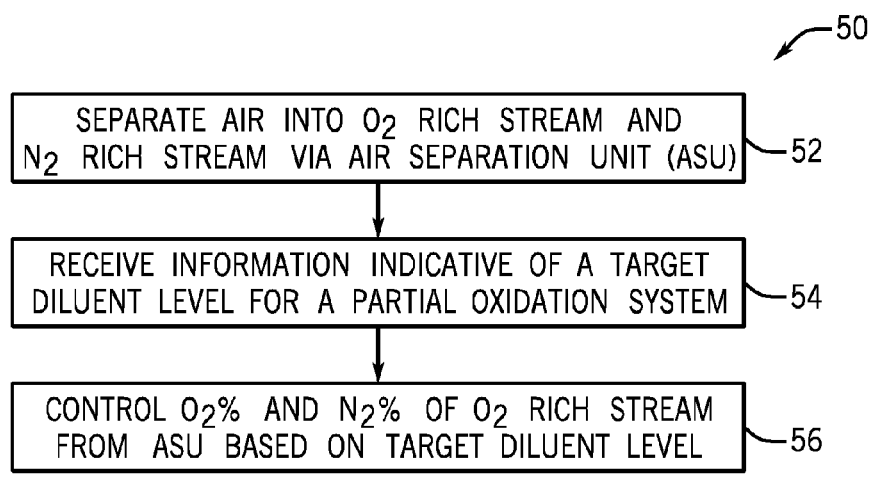
FIG. 2 is a flow chart that shows a process for operating an ASU in accordance with one embodiment of the present invention.

FIG. 2 shows a flow chart of a process 50 that may be used to produce the oxygen rich stream 20 shown in FIG. 1. In a step 52, the ASU 12 separates air into the nitrogen rich stream 18 and the oxygen rich stream 20. In a step 54, the purity control system 26 may receive information indicative of a target diluent level for the partial oxidation system 24. For example, the target diluent level may be at least greater than or equal to approximately 10 percent, 15 percent, 20 percent, 25 percent, or 30 percent. The information may include, for example, the partial oxidation feedback 28, the fuel feedback 30, and/or the user input 32. The target diluent level may correspond to the desired amount of nitrogen in the oxygen rich stream 20 and may be stored in the control software and/or the memory of the purity control system 26 or entered via user input 32. For example, partial oxidation feedback 28 that includes a high temperature for the partial oxidation system 24 may indicate that the target diluent level should be increased. In a step 56, the target diluent level is used as a basis to control the oxygen and nitrogen composition (i.e. percent oxygen and percent nitrogen) of the oxygen rich stream 20 from the ASU 12. Thus, if the target diluent level increases, the ASU 12 is controlled to reduce the oxygen percentage of the oxygen rich stream 20 and increase the nitrogen percentage. Alternatively, the oxygen percentage of the oxygen rich stream 20 may be increased and the nitrogen percentage decreased if the target diluent level decreases. As will be described in detail below, certain devices and/or conditions within the ASU 12 may be controlled to achieve the desired oxygen and nitrogen composition of the oxygen rich stream 20. Thus, the ASU 12 may be controlled to adjust the oxygen percentage and the nitrogen percentage of the oxygen rich stream 20 to at least substantially meet the target diluent level of nitrogen for the partial oxidation system 24.

Figure 3:
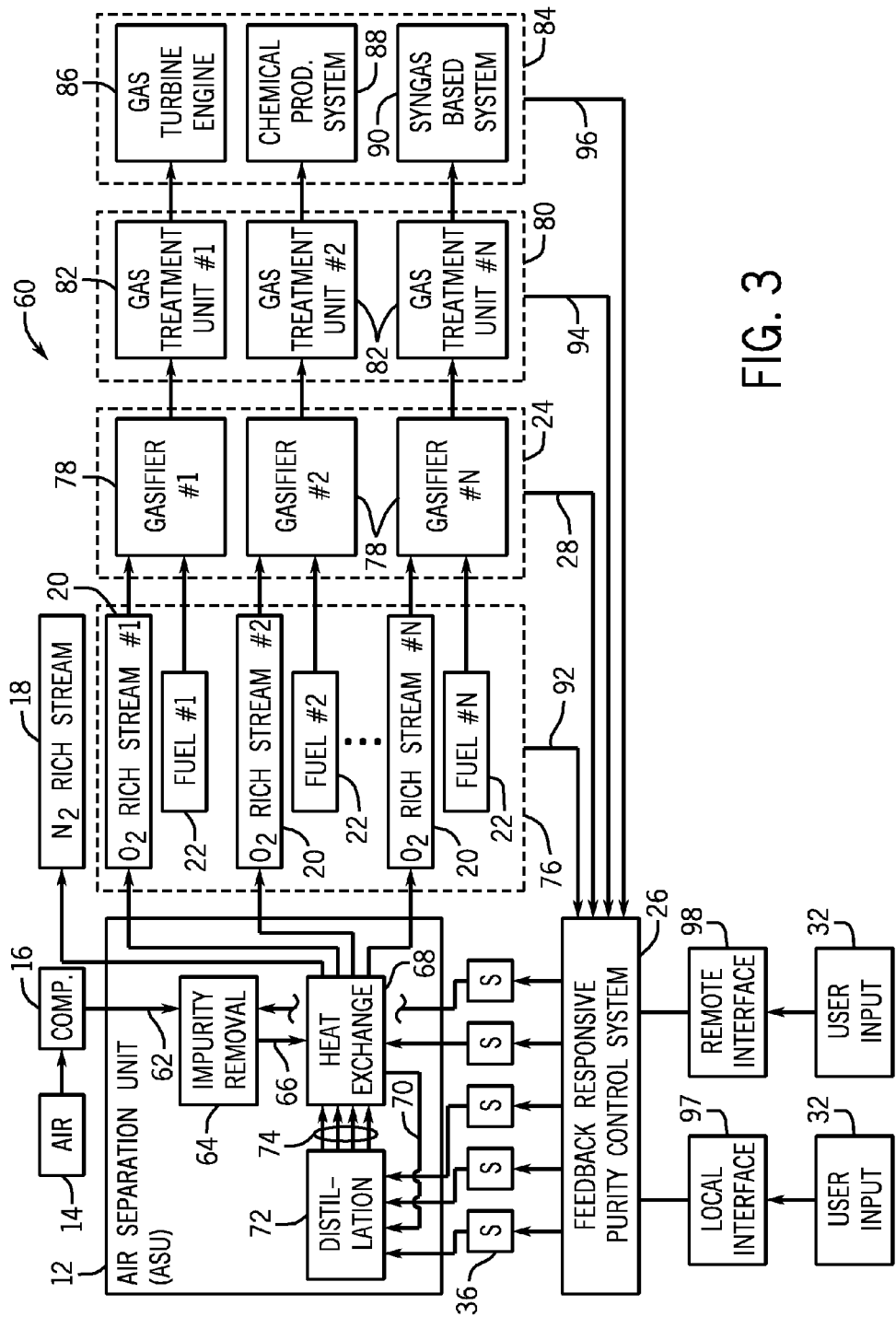
FIG. 3 is a block diagram of an ASU that supplies oxygen to one or more gasifiers in accordance with an embodiment.

FIG. 3 is a block diagram of a system 60 in which the ASU 12 produces one or more oxygen rich streams 20. In other embodiments, one or more ASUs 12 may be configured to produce the one or more oxygen rich streams 20. Elements in common with those shown in FIG. 1 are labeled with the same reference numerals. In the illustrated embodiment, a cryogenic distillation, or fractionation, process is used to separate the air 14 into its primary components. In addition to cryogenic distillation, other suitable systems that may be used in the ASU 12 include, but are not limited to, membrane, pressure swing adsorption, and vacuum pressure swing adsorption. Such systems may be used instead of cryogenic distillation to produce gas streams of lower purities and/or lower flow rates. As illustrated in FIG. 3, untreated compressed air 62 from the air compressor 16 is supplied to an impurity removal unit 64, in which impurities, such as water vapor and $CO_2$, are removed. If such impurities are not removed from the untreated compressed air 62, they may freeze and deposit on internal surfaces of process equipment. The impurity removal unit 64 may include a variety of system to remove the impurities from the untreated compressed air 62, which include, but are not limited to, molecular sieves and reversing heat exchangers. In molecular sieves, molecules of the impurities are adsorbed onto surfaces of molecular sieve materials. In reversing heat exchangers, warm air is passed over frozen water and $CO_2$ to evaporate the water and sublime the $CO_2$ to be returned to the atmosphere.

In the illustrated embodiment, treated compressed air 66 is supplied to a heat exchange unit 68, in which cold streams are used to cool the treated compressed air 66. In operation, heat exchangers are used in the heat exchange unit 68 to transfer heat from the treated compressed air 66 to the cold streams of the ASU 12. For example, the heat exchange unit 68 may cool the treated compressed air 66 until it becomes liquefied air 70 at a temperature less than approximately −175 degrees C., −185 degrees C., or −195 degrees C. Next, a distillation unit 72 is used to separate the liquefied air 70 into the desired streams, which may be rich in primarily one component. For example, depending on the number of the desired streams and the desired purities of the streams, the distillation unit 72 may include one or more distillation columns. Specifically, the distillation unit 72 may include a first distillation column that produces the nitrogen rich stream 18, a second distillation column that produces the oxygen rich stream 20, and additional distillation columns for other gases. Other combinations and configurations of distillation columns may be used in other embodiments. For example, one distillation column may produce both the nitrogen rich stream 18 and the oxygen rich stream 20. As discussed above, the oxygen rich stream 20 may be produced directly from a distillation column and is not a mixture of a relatively pure oxygen stream and a relatively pure nitrogen stream. In addition, the distillation columns of the distillation unit 72 may be trayed or packed. Moreover, because embodiments of the ASU 12 may produce lower purity oxygen, the distillation columns may be smaller, have fewer trays, or less packing than distillation columns of other ASUs. Such embodiments of distillation columns may be less expensive than other distillation columns.

Cold product streams 74 from the distillation unit 72 are then supplied to the heat exchange unit 68 to cool the treated compressed air 66. This heat exchange increases the temperature of the cold product streams 74 prior to leaving the ASU 12. The number of cold product streams 74 may vary depending on the number of distillation columns and/or the number of draw off points from the distillation columns of the distillation unit 72. Specifically, a single distillation column may have one or more draw off points, each capable of producing different purity streams. For example, a first draw-off point may produce a low purity oxygen rich stream 20 and a second draw-off point may produce a high purity oxygen rich stream 20. As illustrated in FIG. 3, one of the cold product streams 74 from the ASU 12 is the nitrogen rich stream 18. Other cold product streams 74 from the ASU 12 include one or more oxygen rich streams 20. In fact, the ASU 12 may be capable of producing up to N number of oxygen rich streams 20. In certain embodiments, the purities and/or the available flow rates of the oxygen rich streams 20 may be different or may vary. For example, a greater flow rate of a low purity oxygen rich stream 20 may be available compared to a smaller flow rate of a high purity oxygen rich stream 20. In certain embodiments, the purity of the different oxygen rich streams 20 may vary by 0 to 30 percent, 5 to 20 percent, or 10 to 15 percent relative to one another. For example, a second stream 20 may be approximately 5 percent more pure than a first stream 20, and a third stream 20 may be approximately 15 percent more pure than the first stream 20.

As shown in FIG. 3, the oxygen rich streams 20 and the one or more fuels 22 constitute a feed system 76. The output from the feed system 76 may be supplied to one or more gasifiers 78, which together may be considered the partial oxidation system 24. Thus, each gasifier 78 is configured to use different oxygen rich streams 20 and/or different fuels 22. As discussed in detail below, the gasifiers 78 may convert the fuels 22 into syngas. The output from the partial oxidation system 24 may be supplied to a gas treatment system 80, which may include one or more gas treatment units 82. As described in detail below, the gas treatment system 80 may remove unwanted components (e.g., acid gases such as hydrogen sulfide or $CO_2$) from the syngas. The treated syngas from the gas treatment system 80 may be supplied to a syngas usage system 84. For example, the syngas usage system 84 may include a gas turbine engine 86, which uses treated syngas to drive a load. Further, the syngas usage system 84 may include a chemical production system 88, which reacts the treated syngas with other chemicals to make desired products. Finally, the syngas usage system 84 may include a syngas based system 90, in which syngas is used in other ways.

Feedback from each of the feed system 76, partial oxidation system 24, gas treatment system 80, and syngas usage system 84 may be sent to the feedback responsive purity control system 26 to be used to determine the purities of the oxygen rich streams 20 produced by the ASU 12. For example, the feed system 76 may generate feed system feedback 92, which may include signals indicative of temperatures, pressures, flow rates, or other parameters of the oxygen rich streams 20 and/or the fuels 22. As described above, the partial oxidation system 24 may generate signals indicative of the partial oxidation feedback 28. Similarly, the gas treatment system 80 may generate gas treatment system feedback 94, which may include temperatures, pressures, flow rates, gas compositions, or other parameters of the gas treatment system 80. Finally, the syngas usage system 84 may generate signals indicative of syngas usage system feedback 96, which may include parameters, such as temperatures, pressures, flow rates, power output, emissions levels, chemical properties, and so forth.

Based on the feed system feedback 92, partial oxidation feedback 28, gas treatment feedback 94, and syngas usage system feedback 96, the control system 26 may generate one or more purity control signals 36. Each signal 36 may be used in a different area of the ASU 12. For example, one signal 36 may be used in the impurity removal unit 64, another signal 36 may be used in the heat exchange unit 68, and several signals 36 may be sent to each of the distillation columns within the distillation unit 72. For example, if the control system 26 determined that the purity of the oxygen rich streams 20 was to be increased, a signal 36 may be sent to a distillation column to increase, for example, a reflux flow rate or a column temperature. In addition, one or more signals 36 may be used in the impurity removal unit 64 and the heat exchange unit 68. Further, the control system 26 may act in real-time to vary the purities of the oxygen rich streams 20 in response to the feedback. If systems other than cryogenic distillation are used in the ASU 12, the control system 26 may send similar signals 36 to the appropriate equipment. Finally, in addition to the described feedback, the control system 26 may receive user input 32, which may be sent to the control system 26 through either a local interface 97 or a remote interface 98. For example, the local interface 97 may be located in a control room adjacent to the ASU 12 and the remote interface 98 may be located in a remote operation center.

Figure 4:
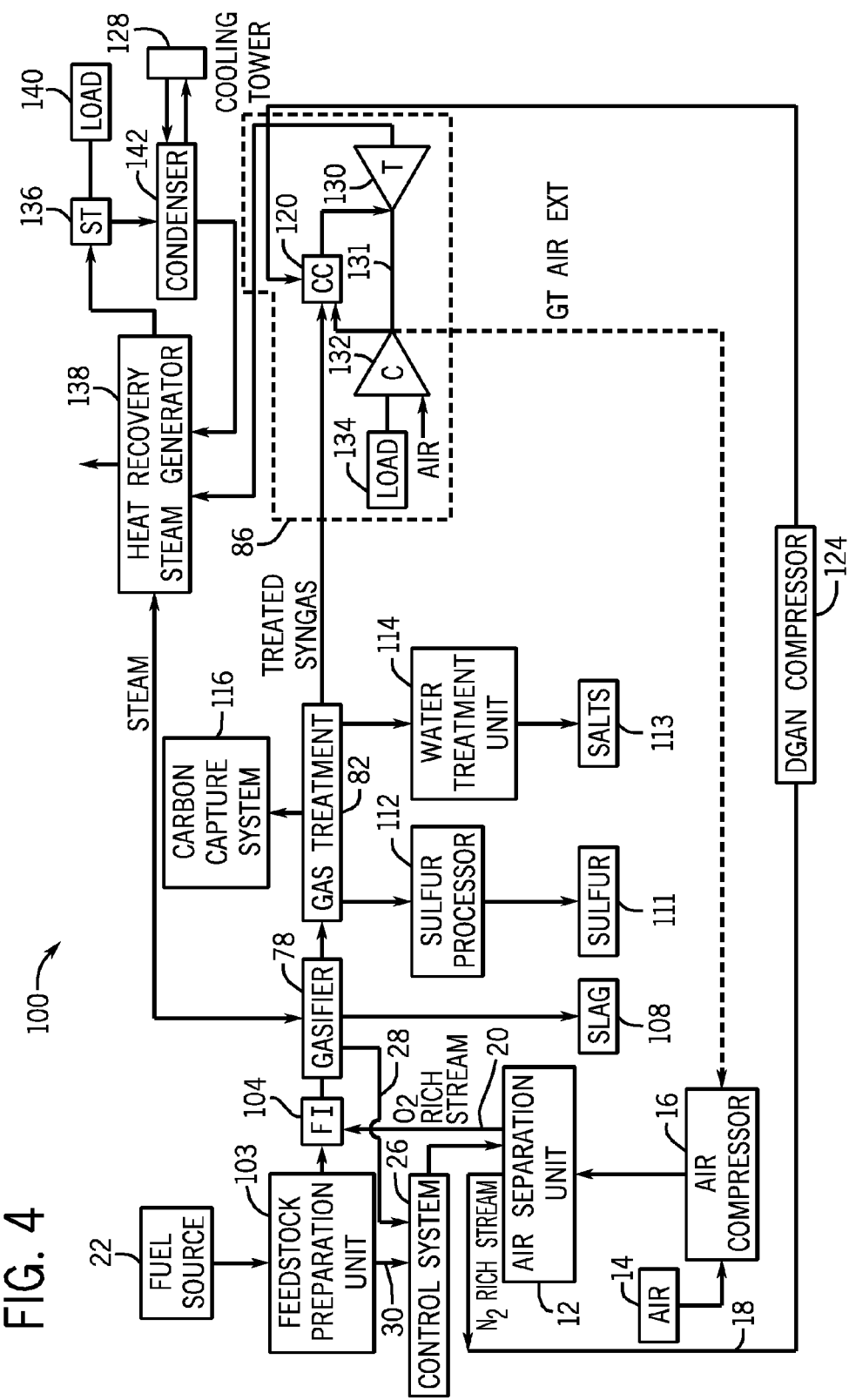
FIG. 4 is a block diagram of an embodiment of an IGCC power plant incorporating an ASU and a purity control system.

FIG. 4 is a diagram of an embodiment of an IGCC system 100 that produces and partially oxidizes syngas. The IGCC system 100 may include an embodiment of the ASU 12 configured to separate air into the oxygen rich stream 20 and the nitrogen rich stream 18 and the purity control system 26 configured to receive input indicative of the target diluent level for the gasifier 78. As discussed above, the purity control system 26 may be configured to control the ASU 12 to adjust the oxygen percentage and the nitrogen percentage of the oxygen rich stream 20 based on the target diluent level. Other elements of the IGCC system 100 may include a fuel source 22, which may be a solid or a liquid, that may be utilized as a feed for the IGCC system 100. The fuel source, or feed source, 22 may include coal, petroleum coke, oil, biomass, wood-based materials, agricultural wastes, tars, coke oven gas and asphalt, or other carbon containing items.

The feed source 22 may be passed to a feedstock preparation unit 103. The feedstock preparation unit 103 may, for example, resize or reshape the feed source 22 by chopping, milling, shredding, pulverizing, briquetting, or palletizing the feed source 22 to generate feedstock. Additionally, water, or other suitable liquids may be added to the feed source 22 in the feedstock preparation unit 103 to create slurry feedstock. In other embodiments, no liquid is added to the feed source 22, thus yielding dry feedstock. In further embodiments, the feedstock preparation unit 103 may be omitted if the feed source 22 is a liquid.

Next, the feedstock may be passed to a fuel injector 104 coupled to the gasifier 78, which is an example of the partial oxidation system 24. The fuel injector 104 combines the various feed streams to the gasifier 78 in such a manner as to promote efficient gasification. Because the diluent is included in the oxygen rich stream 20, the configuration of the fuel injector 104 may be simplified, which may reduce the cost of the fuel injector 104. Specifically, channels or conduits for a separate diluent stream may be omitted in embodiments of the fuel injector 104. The gasifier 78 converts the feedstock into syngas, e.g., a combination of CO, $CO_2$, and hydrogen. This conversion may be accomplished by subjecting the feedstock to a controlled amount of water and the oxygen rich stream 20 at elevated pressures, e.g., from approximately 2000 kilopascals to 8500 kilopascals, and temperatures, e.g., approximately 700 degrees C. to 1600 degrees C., depending on the type of gasifier 78 utilized. The gasification process may generate a solid (e.g., char) and gases (e.g., CO, $CO_2$, hydrogen, water, and nitrogen).

In this way, the gasifier 78 generates a synthesis gas. This synthesis gas may be composed of approximately 85% of CO and hydrogen in various proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 78 may also generate waste, such as slag 108, which may be a wet ash material. This slag 108 may be removed from the gasifier 78 and sent to disposal or various uses. The gas treatment unit 82 may be utilized to clean the untreated syngas. In one embodiment, the gas treatment unit 82 may include a water gas shift reactor. The gas treatment unit 82 may scrub the untreated syngas to remove the HCl, HF, COS, HCN, and $H_2S$ from the untreated syngas, which may include separation of sulfur 111 in a sulfur processor 112, which may use a Claus or similar process. The Claus process uses oxygen, which may be supplied by the oxygen rich stream 20. If the Claus process uses oxygen at a different purity level than the gasifier 78, a separate ASU 12 may be used or the ASU 12 may produce an additional oxygen rich stream 20 with a different purity. Furthermore, the gas treatment unit 82 may separate salts 113 from the untreated syngas via a water treatment unit 114 that may utilize water purification techniques to generate usable salts 113 from the untreated syngas. Subsequently, the gas from the gas treatment unit 82 may include treated syngas (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas is substantially stripped of $H_2S$.

In some embodiments, a carbon capture system 116 may remove and process the carbonaceous gas (e.g., $CO_2$) included in the syngas. The carbon capture system 116 also may include a compressor, a purifier, a pipeline that supplies $CO_2$ for sequestration, enhanced oil recovery, or other uses, a $CO_2$ storage tank, or any combination thereof. The treated syngas, which has undergone the removal of its sulfur containing components and a large fraction of its $CO_2$, may be then transmitted to a combustor 120, e.g., a combustion chamber, of a gas turbine engine 118 as combustible fuel.

The IGCC system 100 may further include the ASU 12. The ASU 12 may operate to separate air 14 into component gases by any of the techniques described above. The ASU 12 may separate oxygen from the air 14 supplied to it from the air compressor 16, and the ASU 12 may transfer the oxygen rich stream 20 to the fuel injector 104. Additionally, the ASU 12 may transmit separated nitrogen as the nitrogen rich stream 18 to a diluent nitrogen (DGAN) compressor 124. The control system 26 may be configured to receive fuel feedback 30 from the feedstock preparation unit 103 and/or the fuel source 22. In addition, the control system 26 may be configured to receive partial oxidation feedback 28 from the gasifier 78. The fuel feedback 30 and/or the partial oxidation feedback 28 may be indicative of a target diluent level for the gasifier 78. Further, the control system 26 may be configured to control the oxygen percentage and the nitrogen percentage of the oxygen rich stream 20 based on the target diluent level. As described above, the purity of the oxygen rich stream 20 produced by embodiments of the ASU 12 may be less than that of other ASUs. Thus, present embodiments of ASUs 12 may use less energy, thereby increasing the efficiency of the IGCC system 100.

The DGAN compressor 124 may compress the nitrogen rich stream 18 received from the ASU 12 at least to pressure levels equal to those in the combustor 120, so as not to interfere with the proper combustion of the syngas. Thus, once the DGAN compressor 124 has adequately compressed the nitrogen rich stream 18 to a proper level, the DGAN compressor 124 may transmit the compressed nitrogen to the combustor 120 of the gas turbine engine 118. The nitrogen of the nitrogen rich stream 18 may be used as a diluent to control the temperature of the combustion turbine.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG)

system 138. The steam turbine engine 136 may drive a second load 140. The second load 140 may also be an electrical generator for generating electrical power. However, both the first 130 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 78. The gas turbine engine 118 generation cycle is often referred to as the "topping cycle," whereas the steam turbine engine 136 generation cycle is often referred to as the "bottoming cycle." By combining these two cycles as illustrated in FIG. 4, the IGCC system 100 may lead to greater efficiencies in both cycles. In particular, exhaust heat from the topping cycle may be captured and used to generate steam for use in the bottoming cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an air separation unit configured to separate air into an oxygen rich stream and a nitrogen rich stream; and
    a purity control system configured to receive input indicative of a target diluent level for a reaction with at least one fuel, wherein the purity control system is configured to control the air separation unit to adjust an oxygen percentage and a nitrogen percentage of the oxygen rich stream based on the target diluent level.

2. The system of claim 1, wherein the purity control system is configured to control the air separation unit to adjust the oxygen percentage and the nitrogen percentage of the oxygen rich stream to at least substantially meet the target diluent level of nitrogen.

3. The system of claim 1, wherein the purity control system is configured to control the air separation unit to reduce the oxygen percentage and increase the nitrogen percentage of the oxygen rich stream in response to an increase in the target diluent level of nitrogen.

4. The system of claim 1, wherein the purity control system is configured to control the air separation unit to increase the oxygen percentage and decrease the nitrogen percentage of the oxygen rich stream in response to a decrease in the target diluent level of nitrogen.

5. The system of claim 1, wherein the purity control system is configured to control the air separation unit to adjust the nitrogen percentage of the oxygen rich stream to at least greater than or equal to approximately 10 percent nitrogen.

6. The system of claim 1, wherein the input comprises at least one of fuel characteristics or partial oxidation characteristics.

7. The system of claim 1, wherein the input comprises at least one of feedback or user input.

8. The system of claim 1, comprising a system with the target diluent level that at least partially oxidizes or gasifies the at least one fuel.

9. The system of claim 8, wherein the system comprises a gasifier configured to gasify the at least one fuel with the oxygen rich stream from the air separation unit.

10. A system, comprising:
    an air separation control system configured to control an air separation unit to separate air into an oxygen rich stream and a nitrogen rich stream, wherein the air separation control system is configured to receive input indicative of a target diluent level of nitrogen for a reaction with at least one fuel, the air separation control system is configured to adjust an oxygen percentage and a nitrogen percentage of the oxygen rich stream based on the target diluent level.

11. The system of claim 10, wherein the air separation control system is configured to control the air separation unit to adjust the oxygen percentage and the nitrogen percentage of the oxygen rich stream to at least substantially meet the target diluent level of nitrogen.

12. The system of claim 10, wherein the air separation control system is configured to control the air separation unit to reduce the oxygen percentage and increase the nitrogen percentage of the oxygen rich stream in response to an increase in the target diluent level of nitrogen, and the air separation control system is configured to control the air separation unit to increase the oxygen percentage and decrease the nitrogen percentage of the oxygen rich stream in response to a decrease in the target diluent level of nitrogen.

13. The system of claim 10, wherein the air separation control system is configured to control the air separation unit to adjust the nitrogen percentage of the oxygen rich stream to at least greater than or equal to approximately 15 percent nitrogen.

14. The system of claim 10, wherein the input comprises an operational characteristic of a system that at least partially oxidizes or gasifies the at least one fuel.

15. The system of claim 10, comprising a system with the target diluent level of nitrogen that at least partially oxidizes or gasifies the at least one fuel.

16. The system of claim 15, wherein the system comprises a gasifier configured to gasify the at least one fuel with the oxygen rich stream from the air separation unit.

17. A method, comprising:
- separating air into an oxygen rich stream and a nitrogen rich stream via an air separation unit;
- receiving input indicative of a target diluent level for a partial oxidation system; and
- controlling an oxygen percentage and a nitrogen percentage of the oxygen rich stream produced from the air separation unit based on the target diluent level.

18. The method of claim 17, wherein controlling comprises adjusting the oxygen percentage and the nitrogen percentage of the oxygen rich stream to at least substantially meet the target diluent level of nitrogen for the partial oxidation system.

19. The method of claim 17, wherein controlling comprises reducing the oxygen percentage and increasing the nitrogen percentage of the oxygen rich stream in response to an increase in the target diluent level of nitrogen for the partial oxidation system, or controlling comprises increasing the oxygen percentage and decreasing the nitrogen percentage of the oxygen rich stream in response to a decrease in the target diluent level of nitrogen for the partial oxidation system.

20. The method of claim 17, wherein receiving input comprises monitoring partial oxidation characteristics of the partial oxidation system or obtaining fuel characteristics of a fuel feedstock for the partial oxidation system.

\* \* \* \* \*